United States Patent
Rodefeld

(12) 
(10) Patent No.: US 6,585,100 B2
(45) Date of Patent: Jul. 1, 2003

(54) ARRANGEMENT FOR FEEDING AND/OR TAKING AWAY MAGAZINES FILLED WITH ARTICLES

(75) Inventor: Dietrich Rodefeld, Hilter (DE)

(73) Assignee: Werner Kammann Maschinenfabrik GmbH, Bunde (DE)

( * ) Notice: Subject to any disclaimer, the term of this patent is extended or adjusted under 35 U.S.C. 154(b) by 0 days.

(21) Appl. No.: 10/103,579

(22) Filed: Mar. 21, 2002

(65) Prior Publication Data

US 2002/0134650 A1 Sep. 26, 2002

(30) Foreign Application Priority Data

Mar. 21, 2001 (DE) .......................................... 101 13 898

(51) Int. Cl.$^7$ .............................................. B65G 37/00
(52) U.S. Cl. .............................. 198/346.1; 414/222.07; 414/790.4; 901/7
(58) Field of Search .................. 198/346.1; 414/222.07, 414/908; 901/7

(56) References Cited

U.S. PATENT DOCUMENTS

| | | | | |
|---|---|---|---|---|
| 5,236,295 | A | * 8/1993 | Ishii et al. ............. | 414/222.07 |
| 6,082,256 | A | 7/2000 | Hellmeier et al. ............ | 101/35 |
| 6,312,519 | B1 | * 11/2001 | Perego ........................ | 118/66 |
| 6,405,610 | B1 | * 6/2002 | Komatsu et al. ........... | 73/865.9 |
| 6,468,353 | B1 | * 10/2002 | Perlov et al. ............... | 118/724 |

FOREIGN PATENT DOCUMENTS

EP 0909728 9/1998

* cited by examiner

Primary Examiner—Joseph A. Dillon
(74) Attorney, Agent, or Firm—Grossman, Tucker, Perreault & Pfleger, PLLC

(57) ABSTRACT

Described is an arrangement for feeding and/or taking away magazines intended to receive individual articles, to and/or from an apparatus for treating and/or handling the articles, wherein the apparatus comprises a first transport element which receives a supply of magazines for feeding articles to be treated, and a second transport element which receives a supply of magazines for carrying away treated articles, with the transport elements being arranged in mutually juxtaposed relationship and movable in a horizontal plane. A third transport element is operatively associated with the first and second transport elements and movable between a first position in which it is towards the first and second transport elements and at least one second position in which it is away from the first and second transport elements. The third transport element has at least one movable carrier for at least one magazine. When the third transport element is in the first position the carrier is movable between a first position associated with the first transport element for receiving a magazine from same or for depositing a magazine at same and a second position associated with the second transport element for receiving a magazine from same or for depositing a magazine at same. When the third transport element is in its second position the carrier can assume a third position for receiving a magazine for articles to be treated and a fourth position for depositing a magazine for treated articles.

20 Claims, 5 Drawing Sheets

ARRANGEMENT FOR FEEDING AND/OR TAKING AWAY MAGAZINES FILLED WITH ARTICLES

FIELD OF THE INVENTION

The invention generally concerns an arrangement for feeding and/or taking away magazines intended to receive individual articles, to and/or from an apparatus for treating and/or handling such articles.

In this specification, the arrangement for feeding and/or taking away the magazines to and/or from the apparatus will be referred to broadly as an arrangement for moving the magazines in relation to the apparatus.

Similarly, the expression apparatus for processing articles will be used to broadly denote the apparatus for treating and/or handling such articles.

By way of example, the apparatus for processing such articles, whether involving actually treating the articles or handling same in an operating procedure, can be a machine for printing on, packaging or implementing other operations in relation to CDs and/or other articles. Hereinafter the arrangement according to the invention will be particularly described in relation to a printing machine without however that entailing a limitation in that respect.

BACKGROUND OF THE INVENTION

One form of arrangement for moving magazines intended to receive individual articles, in relation to an apparatus for processing such articles, can comprise a first transport element for receiving a supply of magazines for feeding articles to be processed, and a second transport element for receiving a supply of magazines for carrying away processed articles. The first and second transport elements can be arranged in mutually juxtaposed relationship, being respectively movable in a horizontal plane.

In this respect reference may be made to EP 0 909 728 A1 describing an apparatus for printing on CDs, which has an arrangement for feeding the articles to be printed upon, to the apparatus, and for carrying away the articles after printing has been applied thereto. Those articles are supplied to the apparatus in the form of a stack constituting a magazine. The magazine essentially comprises a base or tray from which a bar, referred to as a spindle, extends upwardly. The respective articles which are each provided with a central opening can thus be fitted on to the spindle. For the purposes of introducing the articles into the receiving units in the printing machine, they are removed from the stack and thus separated off from each other so as to constitute individual articles. After the printing operation has been completely implemented, they are collected again in a magazine in the form of a stack which is moved out of the apparatus. In general terms the procedure in that case is such that the empty magazines from which the articles to be printed upon had been individually removed are subsequently used again for collecting a stack of articles after printing has been applied thereto.

The arrangement disclosed in EP 0 909 728 A1 admittedly also has a conveyor belt which serves both to feed the apparatus with the magazines filled with the articles to be printed upon, and also to carry away the magazines filled with the printed articles. The arrangement for feeding and taking away the magazines in that fashion is however rather complicated as it performs some additional functions which in many cases may not be required. In addition, it is not very suitable for subsequent fitment to already existing machines which are in production.

SUMMARY OF THE INVENTION

An object of the present invention is to provide an arrangement for moving magazines intended to receive individual articles, in relation to an apparatus for processing such articles, which can avoid disadvantages of prior arrangements and which involves simple structural means for feeding and removing the magazines for the respective articles to be printed upon and which have been printed upon.

Another object of the present invention is to provide an arrangement for feeding and/or removing magazines for receiving individual articles, to and from an article-processing apparatus, which is so designed that the number of operating personnel can be reduced while at the same time affording enhanced safety for such operating personnel.

Yet another object of the present invention is to provide an arrangement for moving magazines for receiving individual articles, to and from an apparatus for processing such articles, which is so designed that the procedure involved in delivering the magazines and removing them is rendered more rational while obviating the need for manual intervention in terms of moving magazines and/or articles in relation to the apparatus.

Yet a further object of the invention is to provide an arrangement for moving magazines for accommodating individual articles, in relation to an apparatus for processing such articles, which affords greater versatility of operation and adaptability to varying operating conditions.

In accordance with the principles of the present invention the foregoing and other objects are attained by an arrangement for moving magazines intended to receive individual articles in relation to an apparatus for processing such articles, which apparatus comprises a first transport element operable to receive a supply of magazines for feeding articles to be processed to the apparatus, and a second transport element operable to receive a supply of magazines for carrying away processed articles. The first and second transport elements are arranged in mutually juxtaposed relationship and are respectively movable in a horizontal plane. The arrangement includes a third transport element adapted to be operatively associated with the first and second transport elements and movable between a first position of being towards the first and second transport elements and at least one second position in which it is away from the first and second transport elements. The third transport element has at least one movable carrier for at least one magazine, which carrier, when the third transport element is in the first position, is movable between a first position operatively associated with the first transport element for receiving a magazine from same or for depositing a magazine on same, and a second position operatively associated with the second transport element for receiving a magazine from same or for depositing a magazine on same while when the third transport element is in its second position the carrier assumes a third position for receiving a magazine for articles to be processed and a fourth position for depositing a magazine for processed articles.

As will be seen in greater detail from a preferred embodiment of the arrangement according to the invention as described hereinafter, the arrangement has the third transport element which is arranged in the direction of transportation movement, in front of the first and second transport elements which are each in the form of turntables movable with a stepwise motion. The turntables serve to feed the magazines to the article-separating station and to carry the magazines away from the collecting station respectively, and thus are operable to perform a certain buffer function. The third transport element bridges over the spacing between the two turntables on the one hand and a conveyor belt for feeding the magazines to the apparatus and for carrying the magazines away therefrom on the other hand. The conveyor belt is generally arranged outside the actual apparatus so that there is no necessity for the operating personnel to manually insert the magazines which are filled with the articles to be processed such as printed upon, into the first transport element, or to manually remove the magazines with the processed articles therein, from the second transport element. As indicated above the first and second transport elements are possibly each in the form of a rotary turntable. Furthermore, the carrier which is mounted pivotably to the third transport element bridges over the spacing between the two turntables so that there is no longer any need for the empty magazine to be transposed manually from the turntable for the articles to be processed, on to the turntable for the processed articles. There is thus no necessity for any operator to implement any handling operations in the region of moving parts of the machinery.

Further objects, features and advantages of the invention will be apparent from the description hereinafter of a preferred embodiment thereof.

DESCRIPTION OF THE PREFERRED EMBODIMENT

Figure 1:
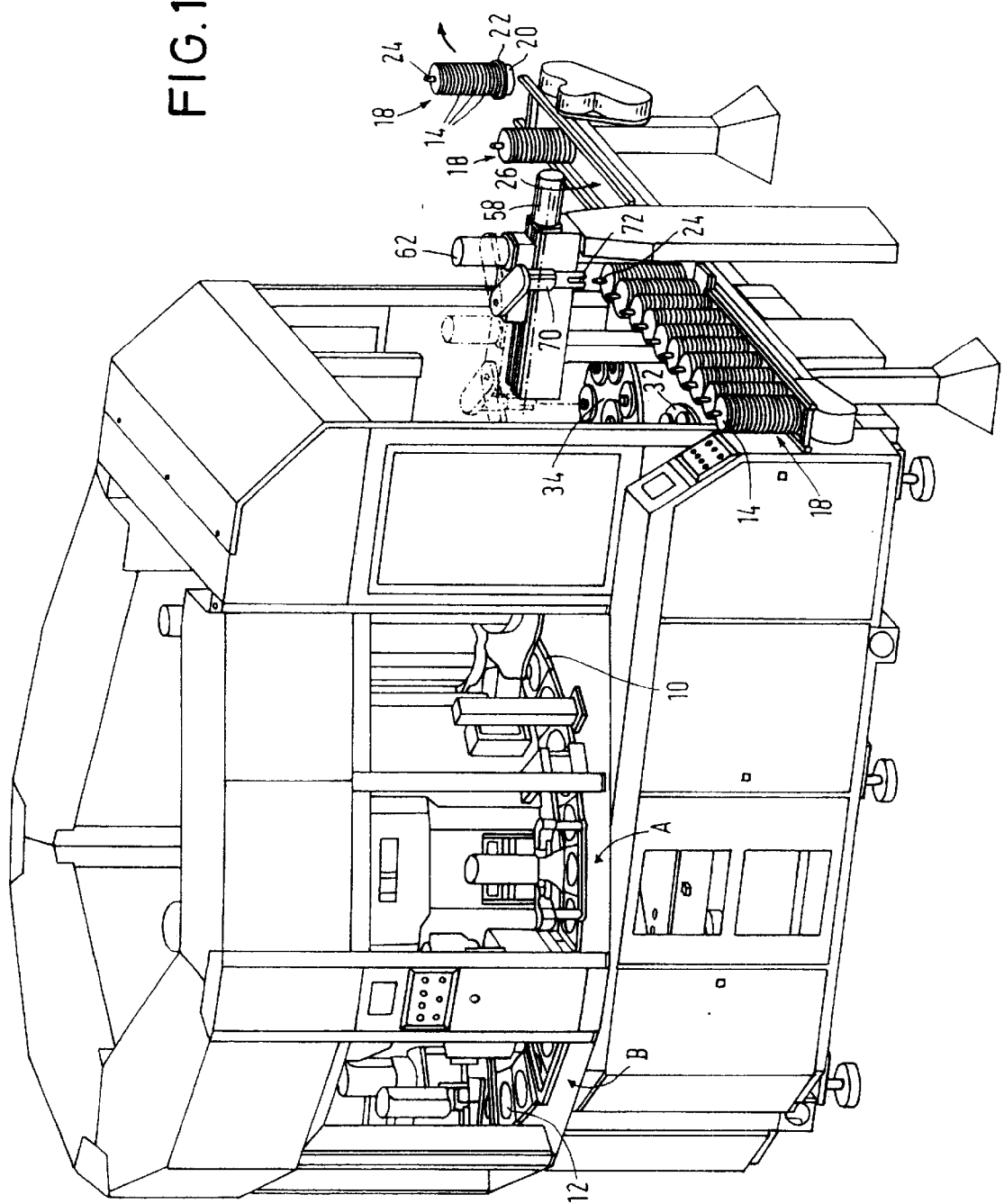
FIG. 1 is a perspective view of a printing machine provided with an arrangement for feeding and removing magazines intended to receive individual articles.
Figure 2:
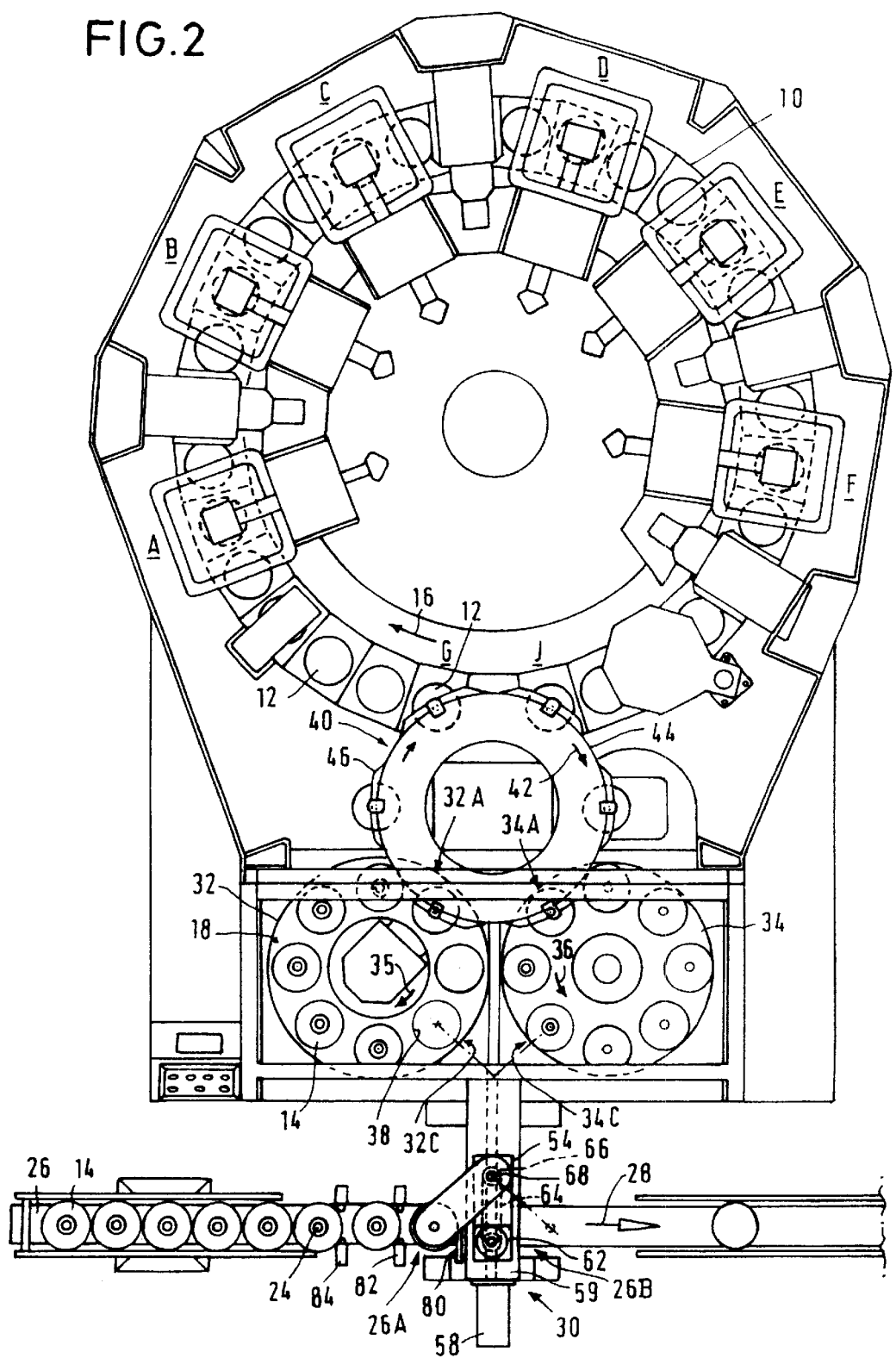
FIG. 2 is a plan view of the machine shown in FIG. 1, but omitting some parts of the casing assemblies, and FIGS. 3A through 3F each show a part of FIG. 2 on a larger scale, with the co-operating components assuming different positions in dependence on the successive illustrated working steps.

Referring firstly to FIGS. 1 and 2, shown therein is an embodiment of an apparatus according to the invention, in the form by way of example of a printing machine for printing on articles in the form of compact disks (CDs). As can be seen from FIG. 2, that printing machine is provided with by way of example six screen printing stations A–F and further treatment stations as required, for example drying stations, stations for removing static from the CDs and so forth and an entry station G and a removal station I. It further has a transport element in the form of an annular disk 10 which rotates with a stepwise movement and which is provided with receiving means or mountings 12 for articles 14 which are to be processed in the machine. The articles which are disposed in the receiving means 12 are transported from one processing station to another in the machine by the stepwise rotational movement of the annular disk 10, in the direction indicated by the arrow 16 in FIG. 2.

The articles to be processed are fed to the apparatus in the form of the printing machine, in magazines which are indicated generally at 18. The magazines 18 in usual manner essentially comprise a base which is indicated at 20 for example in FIG. 1 and which has an edge 22 at its top side, and a bar or spindle 24 which is mounted centrally in the base 20 and which, when CDs are fitted thereon, extends through the central openings of the CDs in the magazine in superposed relationship. Magazines of that kind and the stacked arrangement of the CDs 14 therein are generally known and will therefore not be described in full detail herein.

As can be seen in particular in FIGS. 1 and 2, the CDs to be dealt with in the printing machine are placed on a conveyor belt 26 in the form of respective stacks held by the above-described magazines. The conveyor belt 26 circulates in the direction indicated by the arrow 28 in FIG. 2, preferably with a stepwise movement. Operatively associated with the conveyor belt 26 is a reciprocatable linear conveyor 30 which is provided with a carriage 54 and which is operable to bridge over the spacing between the conveyor belt 26 and first and second transport elements in the form of rotatable turntables 32 and 34 respectively which rotate stepwise in the direction of the arrows 35 and 36 respectively. Each of the turntables 32, 34 is provided with eight holders 38 for a respective magazine. The turntable 32 receives exclusively magazines 18 which contain articles to be printed upon, while the turntable 34 is intended exclusively for accommodating magazines with articles which have already been printed upon.

Reference numeral 40 in FIG. 2 denotes a transfer device operable to bridge over the spacing between the two turntables 32 and 34 on the one hand and the transport means formed by the annular disk 10 with the mountings or receiving means 12 for the individual articles 14 on the other hand. The transfer device 40 is provided with a transfer element 44 which can be raised and lowered and which rotates about a vertical axis with a stepwise movement in the direction of the arrow 42 in FIG. 2. Mounted to the underside of the transfer element 44 distributed at uniform spacings over the periphery thereof are six vacuum holders which are diagrammatically indicated at 46 in FIG. 2 and which are of a usual design configuration in this context and which each have three short pipe portions which can be connected to a vacuum source.

Each magazine 18 which is fed by the linear conveyor 30 to a change-over station indicated at 32C of the turntable 32 in a manner to be described hereinafter passes into the article-separating station 32A after six switching stepwise movements in the direction indicated by the arrow 35. The separating station 32A is provided with known support means (not shown) which can be moved up and down and which engage under the stack of CDs in the magazine and lift it stepwise in such a way that the CD which is respectively uppermost in the stack is disposed at a specific height at which it can be engaged by the respective vacuum holder 46 of the transfer element 44, which is above the stack in the separating station 32A, when the transfer element 44 is moved downwardly. In the course of the following upward movement of the transfer element 40 the respective uppermost CD in the stack in the magazine disposed in the separating station 32A is lifted off and, in the course of two successive motion steps of the transfer element 44 each of 60°, transported into a position above the receiving means or mounting 12 of the disk 10, which is respectively in the entry station G. Thereafter the transfer element 44 is lowered so that the CD held by the vacuum holder 46 of the transfer element 44 passes into that receiving means 12. After the reduced pressure at that vacuum holder is shut off, the transfer element is lifted, with the CD remaining in the receiving means 12 of the receiving station G. The transfer element 44 is moved further on, in the raised condition, by a transport stepping movement, that is to say through 60°. At the same time the rotating disk 10 of the printing machine can be further advanced in the direction of the arrow 16 by a transport step which corresponds to double the spacing of two immediately adjacent receiving means 12 so that now the receiving means 12 which was next but one in opposite relationship to the transport direction 16 and which had been previously emptied passes into the entry station G.

After the magazine 18 in the separating station 32A has been emptied by successive transfer of all CDs into receiving means 12 of the disk 10, then, possibly after further manipulation operations have been implemented, which however are not relevant to full understanding of the present invention, the turntable 32 is rotated through a stepping motion of 45° in the direction indicated by the arrow 35, so that the magazine which is now empty is moved out of the separating station 32A and the filled magazine which follows in opposite relationship to the direction of rotation indicated by the arrow 35 passes into the separating station 32A. In that stepwise movement of the turntable 32, the emptied magazine firstly passes into an intermediate station and from same, by virtue of the next stepping movement, into the change station 32C in which the empty magazine is lifted off the turntable 32 and put into an empty holder of the turntable 34, that holder being respectively disposed in the change station 34C. After six transport stepping movements of the turntable 32 each of 45° in the direction of the arrow 36, that empty magazine passes into the collecting station 34A which is connected by way of the transfer device 40 to the removal station I of the printing machine in which the CDs in the finished processed condition, after having passed twice through the transport path defined by the disk 10, are removed from the respective receiving means 12.

The magazine which is now respectively disposed in the collecting station 34A is oriented relative to the station 1 in which the printed CDs were removed from the respective holder therein and in relation to the transfer element 44, in such a way that that vacuum holder 46 of the rotating transfer element 44, which prior to the last transport stepping movement in the direction of the arrow 42 had deposited a CD to be printed in the receiving station G into a holder disposed therein, comes in to contact in the course of the downward movement of the transfer element 40, with that CD which is in the respective receiving means 12 in the removal station I, and lifts that CD out of the holder there, when the reduced pressure is switched on, in the course of the subsequent upward movement of the transfer element.

In the following transport stepping movement of the transfer element 44 in the direction of the arrow 42 the printed CD is transported out of the removal station I and, in the subsequent transport stepping movement, moved into a position above the magazine in the collecting station 34A. After the transfer element 44 has been lowered again, the printed CD is delivered to that magazine, by a procedure whereby the vacuum is shut down and thereupon the CD drops down and in so doing slides over the spindle 24 of the magazine until finally it comes to rest on the base 20 of the magazine, an intermediate portion carrying the stack, or a CD which is already disposed thereon.

When the magazine disposed in the collecting station 34A is filled, the turntable 34 is caused to rotate further in the direction of the arrow 36 by a stepping movement through 45° so that the empty magazine of the turntable, which follows in opposite relationship to the direction of rotation 36, passes into the collecting position 34A. With the stepping movement of the turntable 34 which then follows, the magazine passes into the change station 34C in which it is then removed from the turntable 34 by the linear conveyor 30 in a manner to be described herein, to be transported to the conveyor belt 26.

After a CD has been deposited in the respective magazine in the collecting station 34A, the transfer element 44 is lifted again, whereupon the vacuum holder which at that moment in time is disposed in the collecting station 34A, in the course of the following stepping movement in the direction of the arrow 42, again passes into the separating station 32A associated with the turntable 32, in order for a CD to again be received in the manner already described hereinbefore from the magazine which is respectively disposed in that station, and in the course of the two following transport stepping movements, to be transported into a position above the receiving means 12 which is then in the entry station G, in order to be deposited therein.

Figure 3A:
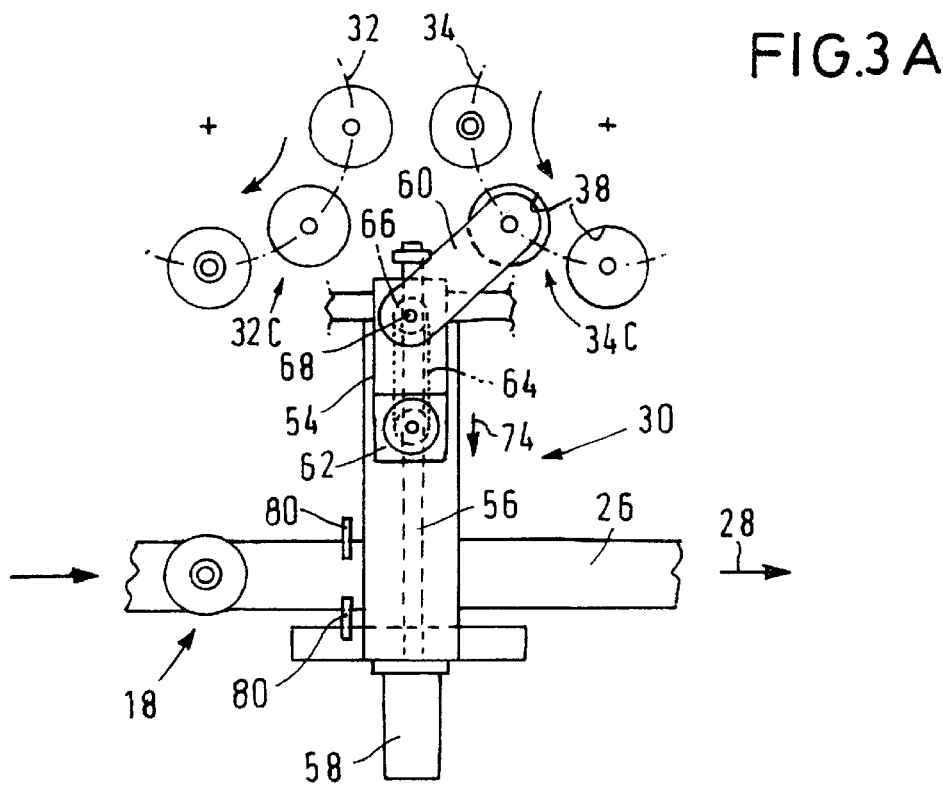
Figure 3B:
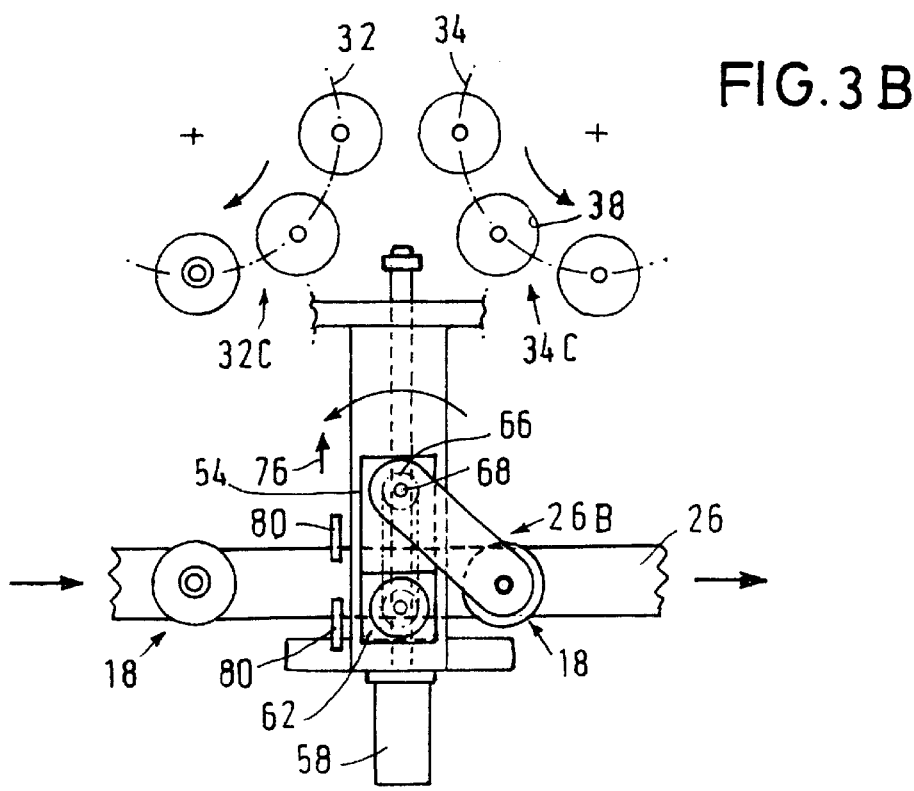
Figure 3C:
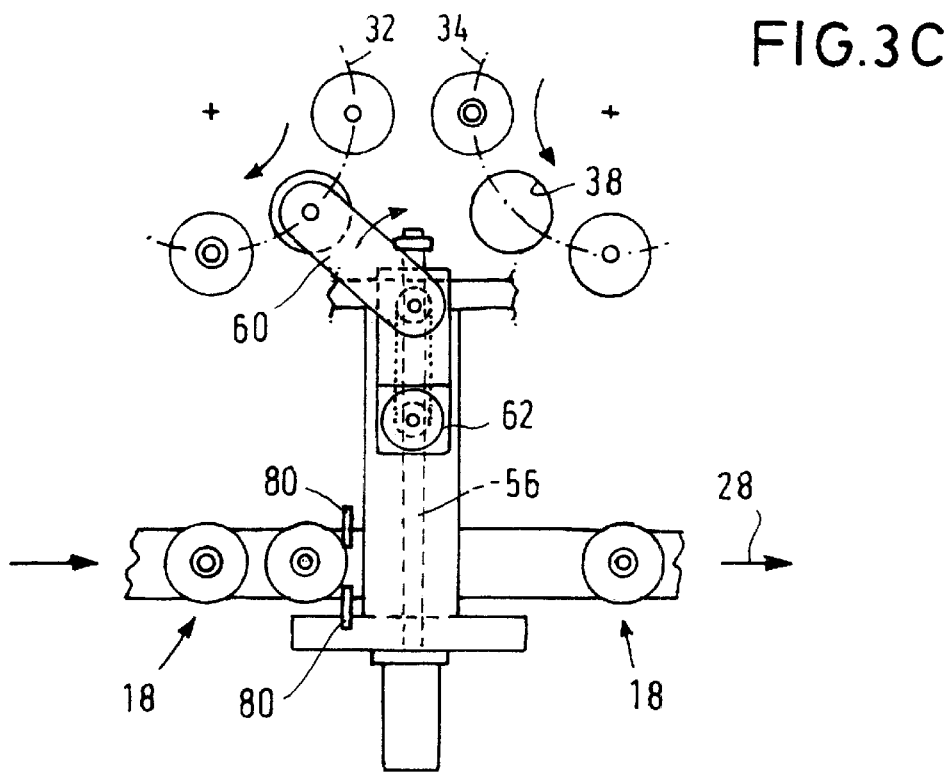
Figure 3D:
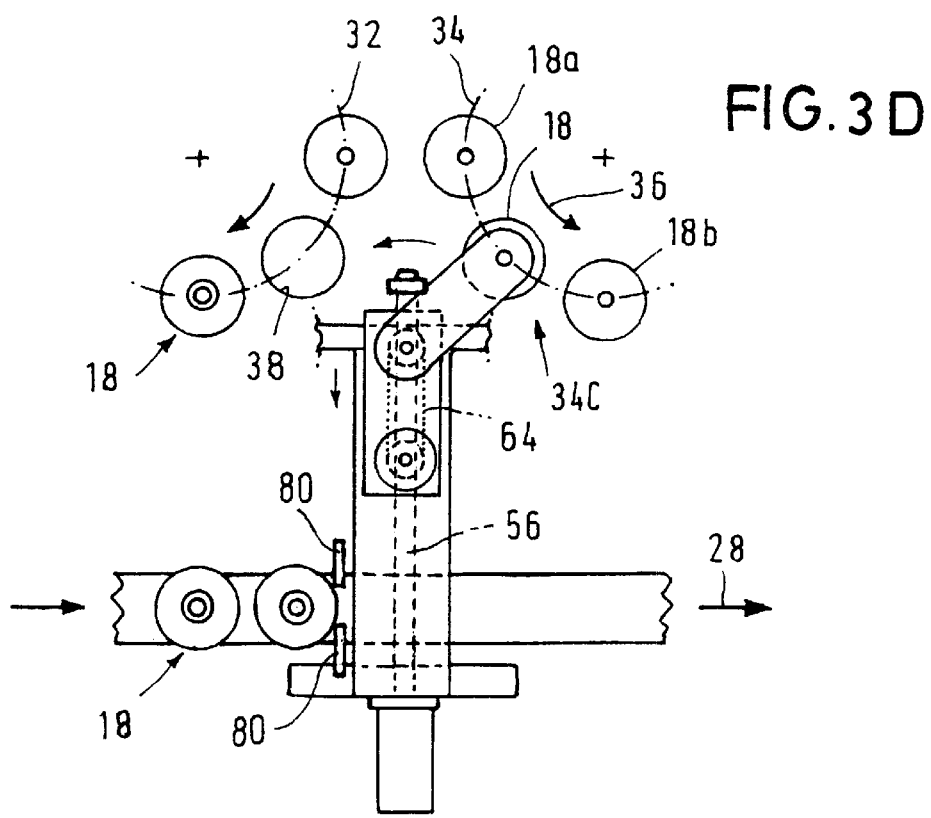

The linear conveyor 30 which is arranged at a higher level than the two turntables 32, 34 and the conveyor belt 26, besides the above-mentioned reciprocatable carriage 54 which is provided with a spindle nut (not referenced), has a stationary spindle indicated at 56 in FIGS. 3A, 3C and 3D, which is driven by an electric motor 58 mounted to a guide 59 for the carriage 54. The path of movement of the carriage 54 and thus the spindle 56 extend in symmetrical relationship with the two turntables 32, 34, the transfer device 40 and the annular transport disk 10, as can be seen particularly clearly from FIG. 2.

Mounted to the end of the carriage 54, which is towards the transfer device 40, is an arm indicated by reference 60 for example in FIG. 3A. The arm 60 is mounted pivotably in a horizontal plane and is driven by an electric motor 62. For that purpose, the output shaft of the motor 62 which is carried by the carriage 54 is provided with a pinion driving an endless chain or an endless toothed belt 64 engaging with a gear or pulley 66 fixedly connected to a shaft 68, to the one end of which the pivotal arm 60 is mounted.

A piston-cylinder unit indicated at 70 in FIG. 1 is fixed to the pivot arm 60 in the proximity of the free end thereof. It will be seen that the piston-cylinder unit 70 extends downwardly from the arm 60 in FIG. 1. Mounted at the free end of the piston rod of the piston-cylinder unit 70 is a gripper shown at 72 in FIG. 1, which can be moved up and down by suitable actuation of the piston-cylinder unit 70.

Figure 3E:
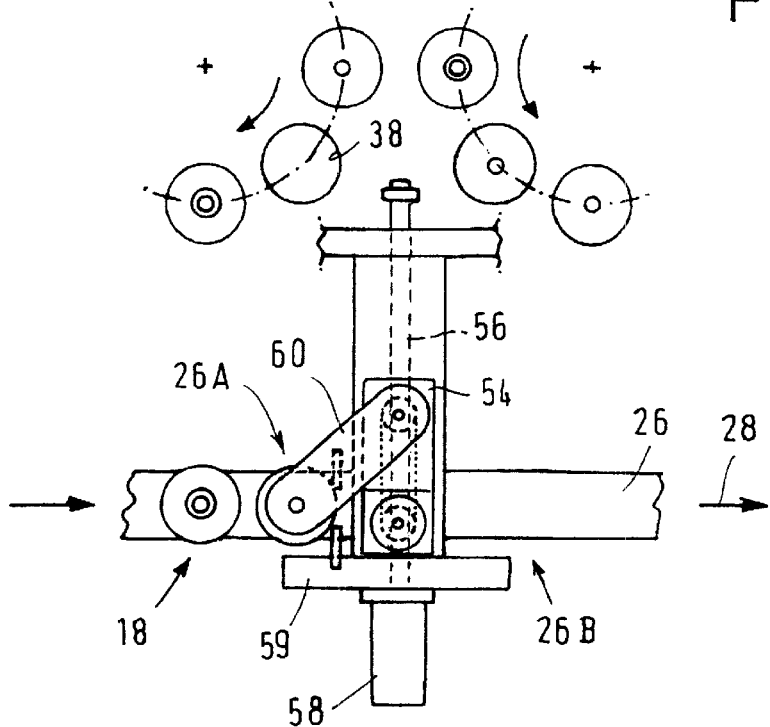

The carriage 54 is slidable between the first limit position in which it is towards the two turntables 32 and 34, as shown in FIGS. 3A, 3C, 3D and 3F, and a second limit position which is shown in FIG. 3B and also FIG. 3E.

Figure 3F:
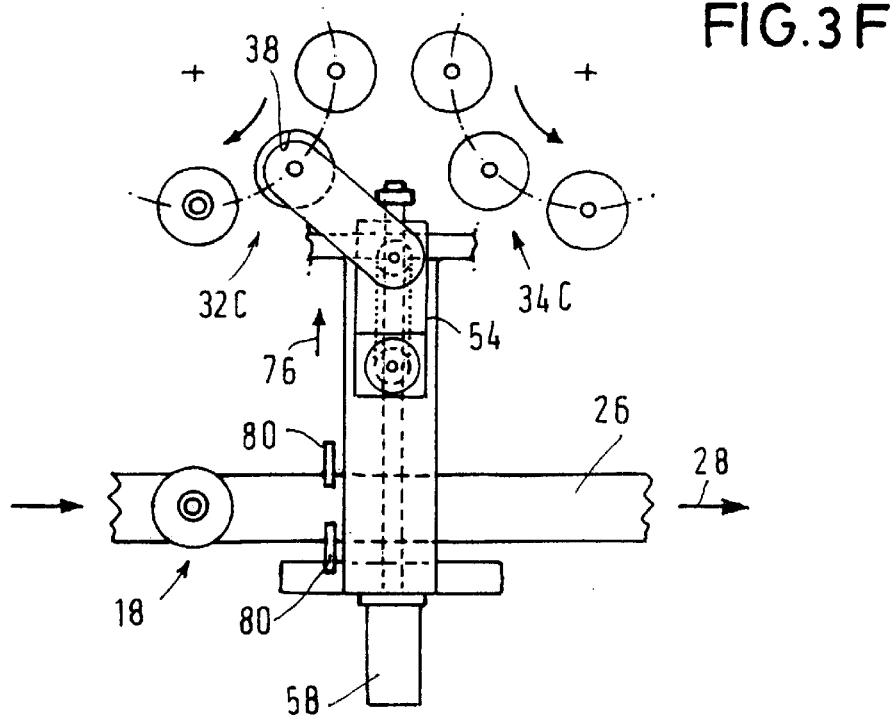

The pivotal arm 60 is of such dimensions and arrangement that the gripper 72 of the piston-cylinder unit 70, at the free end of the arm 60, can be positioned, in dependence on the angular position of the pivotal arm 60 relative to the carriage 54, when the carriage 54 is in the first position, above the change station 32C operatively associated with the turntable 32, as shown in FIGS. 3C and 3F, or above a magazine present in that station or above the change station 34C operatively associated with the turntable 34 or above a magazine present in one of those stations, more specifically in such a way that the gripper 72 extends in substantially coaxial relationship with the spindle 24 of the respective magazine.

After the carriage 54 and the pivotal arm 60 have assumed the position shown in FIG. 3A and there is in the change station 34C a magazine which had been previously filled in the collecting station 34A, the gripper 72 can be moved downwardly by suitable actuation of the piston-cylinder unit 70, in such a way that the upper end region of the spindle 24 of that magazine is within the gripper 72. After the gripper has been closed and has gripped the spindle 24 the gripper is lifted by suitable actuation of the piston-cylinder unit 70, whereby the magazine is entrained and is lifted out of its holder in the turntable 34, to such an extent that it comes out of engagement with the turntable and does not collide with any other parts of the machine in the following transportation movements. Then, by means of suitable actuation of the electric motor 58, the carriage 54 is displaced in the direction of the arrow 72 into its second limit position in which it is towards the conveyor belt 26. Preferably simultaneously with that movement of the carriage 54 the pivotal arm 60 is pivoted by suitable actuation of the electric motor 62 out of the position relative to the carriage 54 shown in FIG. 3A, into the position shown in FIG. 3B in which the gripper 70 is disposed above the conveyor belt 26. Thus, upon downward movement of the gripper 72 by suitable actuation of the piston-cylinder unit 70, the magazine 18 is put down on to the conveyor belt 26 in the deposit station 26B. In the pivotal movement between the position shown in FIG. 3A and the position shown in FIG. 3B, which is about 90°, the pivotal arm 60, in relation to the carriage 54 carrying it, experiences a pivotal movement of about 90°. In that movement, the pivotal arm 60 remains on the same side of the plane of symmetry defined by the path of movement of the carriage 54.

After the gripper 72 has released the magazine it is moved upwardly. The carriage 54 is moved possibly at the same time into the first position, in the direction indicated by the arrow 76. During that movement the pivotal arm 60 can be pivoted through 90° relative to the carriage 54 so that, at the end of the linear movement, it again approximately assumes the position shown in FIG. 3A. That is followed by further pivotal movement of the pivotal arm 60 through about 90° into the position shown in FIG. 3C, in the course of which the pivotal arm 60 moves to the other side of the above-mentioned plane of symmetry on which the turntable 32 is positioned. The specific way in which the pivotal movement of the pivotal arm 60 takes place from the position shown in FIG. 3B into the position shown in FIG. 3C depends inter alia also on how high the pivotal arm 60 is arranged above the holder 59 for the carriage 54. In the illustrated embodiment, as can be clearly seen from FIG. 1, the movement of the pivotal arm 60 from one side of the plane of symmetry on to the respective other side would be possible only when the carriage 54 is in or adjacent to the first limit position as shown in FIGS. 3A, 3C, 3D and 3F.

In the position shown in FIG. 3C, the gripper 72 carried by the pivotal arm 60 is aligned coaxially with respect to the respective holder 38 in the change station 32C, or the respective magazine in the holder. The open gripper 72 is moved downwardly so that the upper end of the spindle 24 passes into the region of the gripper 72, whereupon the gripper is closed and in closing grips the upper end of the spindle 24. Thereafter the gripper is lifted so that the magazine comes out of engagement with the respective holder 38 in the change station 32C. The pivotal arm 60 is then pivoted out of the position shown in FIG. 3C into that shown in FIG. 3D, which corresponds to the position shown in FIG. 3A. The gripper is moved downwardly in order to fit the empty magazine which it is holding into the holder 34 which is respectively disposed in the change station 34C. Thereafter the gripper is opened and moved upwardly, whereupon the pivotal arm 60 is pivoted into the position shown in FIG. 3C, in the empty condition, that is to say without a magazine.

The carriage 54 is then moved into the position shown in FIG. 3E. During that movement the pivotal arm 60 performs a further pivotal movement through about 90° in a direction towards the conveyor belt 26, in such a way that, when the carriage 54 is in the second position shown in FIG. 3E, the gripper 70 is in a position above a magazine with CDs to which printing is to be applied, the magazine standing on the conveyor belt 26 in the receiving station 26A associated therewith. The receiving station 26A is substantially defined by a pair of abutments which are indicated at reference 80 in for example FIG. 2 and FIGS. 3A through 3D. The abutments 80 project above the conveyor belt 26 into the path of movement of magazines 18 carried thereon, and defines the position of the magazine 18 with CDs to be printed upon, which is the respective first magazine in the direction of transportation movement on the conveyor belt 26. The abutments 80 can be arranged stationarily as they define the end of the transportation path defined by the conveyor belt 26 for the magazines 18 with the CDs to be printed upon.

The magazine which is disposed in the receiving station 26A is gripped in the manner already described above at the upper end of its spindle 24 and lifted off the belt 26. Thereupon, the carriage 54 is moved in the direction of the arrow 76 into the first position, while possibly at the same time the pivotal arm 60 pivots through about 90° with respect to the carriage 54 in such a way that, when the carriage 54 assumes the first position, the pivotal arm 60 with the gripper 72 and the magazine 18 hanging therefrom, is positioned as shown in FIG. 3F above the respective holder 38 which is disposed in the change station 32C and into which the magazine 18 is deposited in the manner already described hereinbefore.

Since, as also already described, in the preceding step as shown in FIG. 3D an empty magazine 18 had been fitted into the holder in the change station 34C and then the gripper 72 opened and moved upwardly out of engagement with the spindle 24 of the magazine 18, the turntable 34 is moved by a further step in the direction of the arrow 36 as soon as the magazine which is disposed at that moment in time in the collecting station 34A had been filled with printed CDs, so that, at the end of that stepping movement, the magazine which follows in opposite relationship to the direction of rotation 36, as indicated at 18a in FIG. 3D, passes into the change station 34C, and the empty magazine which had been previously fitted into the holder of the change station 34C assumes the position of the magazine indicated at 18b in FIG. 3D, which follows in the direction of rotation 36. In that way the pivotal arm 60 which, in accordance with the above-described sequence of operating movements, had just deposited a magazine with articles to be printed upon, in the respective holder disposed in the change station 32C, can be pivoted from the position shown in FIG. 3F through about 90° in an empty condition into the position shown in FIG. 3A in order to lift the following magazine out of the holder which is now in the change station 34C and to transport it in the manner described hereinbefore with reference to FIGS. 3A and 3B into the deposit station 26B which is associated with the conveyor belt 26. The following working cycle is commenced with those steps. The empty magazines which are disposed in the holders between the change station 34C and the collecting station 34A in the direction of rotation indicated by the arrow 36 represent a buffer in order to ensure that there are always sufficient empty magazines available to accommodate the printed CDs in the collecting station 34A.

The turntable 32 can be moved along by a stepping movement in the direction indicated by the arrow 35 as soon as the empty magazine 18 has been lifted out of the last station 32C and moved by the pivotal movement of the pivotal arm 60 into the position shown in FIG. 3D, out of the region of movement of the magazines on the turntable 32. The magazines which are filled with unprinted CDs and which are disposed between the change station 32C and the separating station 32A in the direction of movement indicated by the arrow 35 serve as a buffer in order to ensure that there is always a filled magazine in the separating station 32A.

The portion of the conveyor belt 26 for the magazines with the articles to be printed upon can be provided with further pairs of abutments as indicated by references 82 and 84 as indicated in FIG. 2, which are respectively reciprocatable between an operative position in which they project into the path of movement of the magazines 18 for the articles to be printed upon in the printing machine, and an inoperative position. The abutments 82, 84 essentially serve to ensure that the respective magazine in the receiving station 26A is at a spacing from the following magazines and is thus freely movable after it has been gripped by the gripper 72.

It will be noted at this juncture that the drive arrangement for opening and closing the gripper 72 is not specifically illustrated in the drawing but it will be appreciated that there are many different forms of drive means which are suitable for the present purpose and which can be fitted to attain the required aim of actuation.

The conveyor belt 26 can circulate continuously or discontinuously. As there are always determinable periods of time between the removal of magazines from the conveyor belt 26 and the operation of putting magazines on to the conveyor belt 26, with those periods of time being determined by the through-put capacity of the printing machine, it will generally be appropriate for the conveyor belt 26 to be caused to run discontinuously. When the conveyor belt 26 runs continuously it could be desirable to also provide in the placement station 26B a releasable abutment which, when a magazine is placed on the conveyor belt 26, prevents it from being entrained by the conveyor belt 26, with the abutment being removed only when the operation of placing a magazine on the conveyor belt has been concluded and the magazine has been released from the gripper 72.

Instead of the one conveyor belt 26 which extends through the apparatus, for conveying all magazines, it would also be possible to provide two conveyor belts which are arranged in successive alignment and of which a first conveyor belt as considered in the transportation direction indicated by the arrow 28 receives the magazines for the articles to be printed upon and extends approximately as far as the linear conveyor 30, while the second conveyor belt begins approximately at the linear conveyor 30 and receives the magazines filled with the printed articles and transports them away.

Even when the printing machine has a high through-put capacity, the period of time required for separating and collecting the CDs of a magazine is so great that the above-described movements of the co-operating conveyor and transport means can be carried out without that entailing a detrimental effect on the through-put capacity of the overall piece of equipment.

Although the embodiment described hereinbefore and illustrated in the drawing serves for printing on CDs, it will be appreciated that use of the invention is not limited to articles of that nature. In addition the invention can be applied not only to printing machines as described hereinbefore as a preferred embodiment, but in general terms also to those machines in which articles have to be supplied to a piece of equipment for treatment and/or handling thereof and have to be carried away again after that processing operation has been carried out.

It will be appreciated that the above-described embodiment of the invention has been set forth solely by way of example and illustration of the principles thereof and that various other modifications and alterations may be made therein without thereby departing from the spirit and scope of the invention.

What is claimed is:

1. A machine including an apparatus for processing articles which comprises a first transport element operable to receive a supply of magazines for feeding articles to be processed and a second transport element operable to receive a supply of magazines for carrying away processed articles, the first and second transport elements being arranged in mutually juxtaposed relationship and respectively operable in a horizontal plane, and an arrangement for moving magazines intended to receive individual articles in relation to the apparatus, the arrangement comprising a third transport element operatively associated with the first and second transport elements and movable between a first position in which it is towards the first and second transport elements and at least one second position in which it is away from the first and second transport elements, on the third transport element at least one movable carrier for at least one magazine, and means adapted to actuate the carrier in such a manner that when the third transport element is in its first position the carrier is movable between a first position operatively associated with the first transport element for the transfer of a magazine between the carrier and the first transport element and a second position operatively associated with the second transport element for the transfer of a magazine between the carrier and the second transport element and when the third transport element is in its said second position the carrier is movable between a third position for receiving a magazine for articles to be processed and a fourth position for depositing a magazine for processed articles.

2. An arrangement for moving magazines intended to accommodate individual articles in relation to an apparatus for processing said articles, wherein said apparatus comprises a first transport element operable to receive a supply of magazines for feeding articles to be processed, and a second transport element operable to receive a supply of magazines for carrying away processed articles, the first and second transport elements being arranged in mutually juxtaposed relationship and being respectively operable in a horizontal plane, the arrangement including a third transport element adapted to be operatively associated in use of the arrangement with the first and second transport elements and movable between a first position in which it is towards the first and second transport elements and at least one second position in which it is away from the first and second transport elements, on the third transport element at least one movable carrier for at least one magazine, and actuating means for actuating the carrier in such a fashion that when the third transport element is in its said first position the carrier is movable between a first position operatively associated with the first transport element for the transfer of a magazine between the carrier and the first transport element and a second position operatively associated with the second transport element for the transfer of a magazine between the carrier and the second transport element and when the third transport element is in its said second position the carrier is movable between a third position for receiving a magazine for articles to be processed and a fourth position for depositing a magazine for processed articles.

3. An arrangement as set forth in claim 2 wherein said actuating means are operable to actuate the carrier whereby when said third transport element is in its said first position said carrier assumes relative to said third transport element a different position from when the third transport element is in its said second position.

4. An arrangement as set forth in claim 2 wherein the path of transport movement of the third transport element defines a vertical plane and
wherein first and second positions of the carrier on the one hand and second and fourth positions of the carrier on the other hand are at respectively different sides of said vertical plane.

5. An arrangement as set forth in claim 2 wherein said actuating means are operable to actuate the carrier to cause the magazine received by the carrier in said third position thereof to be set down when the carrier is in the first position thereof.

6. An arrangement as set forth in claim 2 wherein said actuating means are operable to actuate the carrier to cause the magazine received by the carrier in said second position thereof to be set down when the carrier is in the fourth position thereof.

7. An arrangement as set forth in claim 2 wherein the third and fourth positions of the carrier are the same.

8. An arrangement as set forth in claim 2 wherein the first and second transport elements are rotatable stepwise and have holders for respective magazines.

9. An arrangement as set forth in claim 2 wherein the third transport element is arranged reciprocatably,
further including means for producing reciprocating movement of said third transport element.

10. An arrangement as set forth in claim 2 wherein the third transport element includes a slidable carriage, and
wherein the carrier is mounted vertically displaceably on the carriage.

11. An arrangement as set forth in claim 2 wherein the carrier comprises a member mounted on the third transport element.

12. An arrangement as set forth in claim 11 wherein said carrier member is mounted pivotably in a horizontal plane.

13. An arrangement as set forth in claim 2 wherein the carrier has a gripping member for gripping a respective magazine.

14. An arrangement as set forth in claim 13 wherein the gripping member of the carrier is operable to engage the free end of a spindle of a magazine on which individual articles are fitted.

15. An arrangement as set forth in claim 13 wherein the gripping member is mounted to the carrier with the interposition of a means for producing vertical displacement of the gripping member.

16. An arrangement as set forth in claim 15 wherein said means for producing vertical movement includes a piston-cylinder unit.

17. An arrangement as set forth in claim 2 wherein associated with said second position of the third transport element away from said first and second transport elements is at least one fourth transport element for magazines, in such a way that in said second position of the third transport element said carrier is operable for the transfer of a magazine between the carrier and the fourth transport element.

18. An arrangement as set forth in claim 17 wherein the carrier comprises a pivotal arm operable to perform a pivotal movement during the movement of the third transport element between the first and second positions thereof and the fourth transport element.

19. An arrangement as set forth in claim 17 and further including
a common fourth transport element for feeding magazines to be received by the first transport element and for conveying away magazines removed from the second transport element.

20. An arrangement as set forth in claim 19 wherein said common fourth transport element is in the form of a conveyor belt.

* * * * *